Dec. 28, 1948.  E. C. DE SMET ET AL  2,457,211
MOTOR VEHICLE LIGHTING
Filed April 23, 1945  2 Sheets-Sheet 1
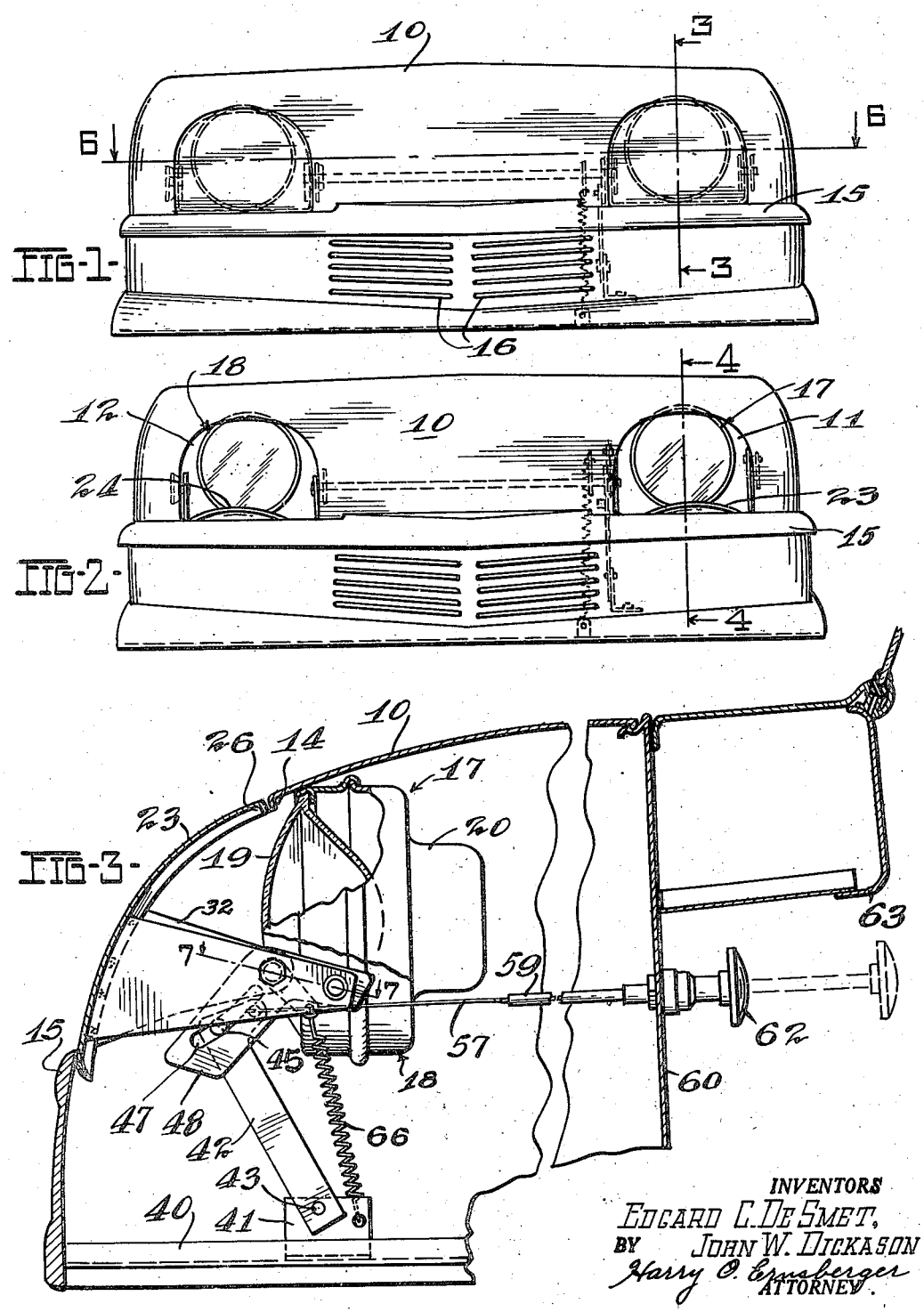
INVENTORS
EDGARD C. DE SMET,
BY  JOHN W. DICKASON
Harry O. Ernsberger
ATTORNEY.

Dec. 28, 1948.  E. C. DE SMET ET AL  2,457,211
MOTOR VEHICLE LIGHTING
Filed April 23, 1945  2 Sheets-Sheet 2
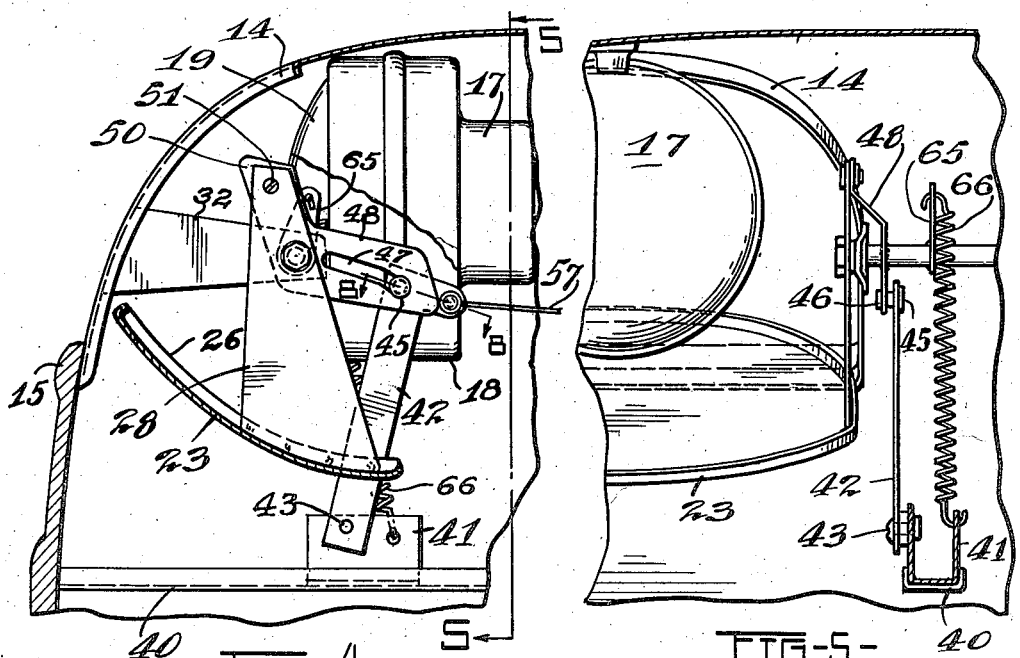
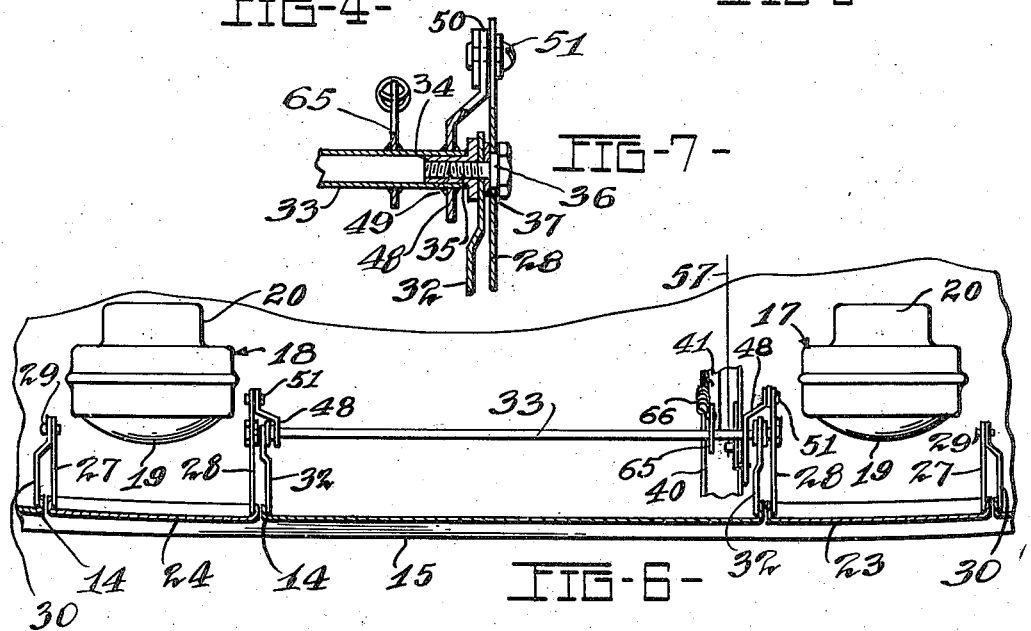
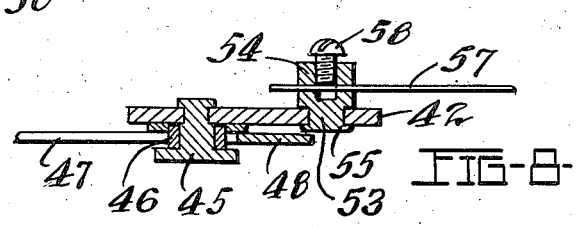
INVENTORS
EDGARD C. DE SMET,
BY JOHN W. DICKASON
Harry O. Ernsberger
ATTORNEY.

Patented Dec. 28, 1948

2,457,211

UNITED STATES PATENT OFFICE 2,457,211

MOTOR VEHICLE LIGHTING

Edgard C. De Smet and John W. Dickason, Toledo, Ohio, assignors to Willys-Overland Motors, Inc., Toledo, Ohio, a corporation of Delaware Application April 23, 1945, Serial No. 589,912

2 Claims. (Cl. 240—7.1)

This invention relates to lighting for motor vehicles and more especially to headlamp arrangements therefor.

The invention comprehends the incorporation of lamp structures in a vehicle construction in cooperation with simple yet effective means for masking or screening the lamps when the same are not in use.

The invention embraces the provision of a vehicle headlamp arrangement particularly disposed for cooperation with movable closures or masks for the lamps which in closed or masking position preserves the continuity of the frontal body surface of the vehicle.

An object of the invention resides in the provision of a closure or masking means for a vehicle headlamp arranged for pivotal movement about a fixed axis so that the closure may be readily moved to closed or open position by simple yet effective means.

Another object of the invention is the provision of a masking closure for a vehicle headlamp and manipulating means therefor which incorporates an arrangement whereby the closure may be retained in closed or open position.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a front elevational view of a frontal surface of a vehicle body illustrating a form of lamp masking means of our invention with the masking means in closed position;

Figure 2 is a view similar to Figure 1 showing the lamp closures or masking means in open or unmasking position;

Figure 3 is an enlarged vertical sectional view taken substantially on the line 3—3 of Figure 1 and showing one form of manipulating means for operating the closure;

Figure 4 is a vertical sectional view taken substantially on the line 4—4 of Figure 2 showing the closures in open position;

Figure 5 is a fragmentary detail sectional view taken substantially on the line 5—5 of Figure 4;

Figure 6 is a horizontal sectional view taken substantially on the line 6—6 of Figure 1;

Figure 7 is a fragmentary sectional view taken substantially on the line 7—7 of Figure 3;

Figure 8 is a sectional view taken substantially on the line 8—8 of Figure 4.

While we have illustrated one form of our invention as adapted for masking a vehicle headlamp or screening an opening through which light rays from the headlamp are normally projected, it is to be understood that we contemplate the use of our invention in any arrangement whereby the same may be found to have utility.

Referring to the drawings in detail, the vehicle body portion illustrated is inclusive of a frontal surface 10 provided with openings 11 and 12 which are bounded at the upper and lateral edges by inwardly extending flanges 14. Disposed ahead of or projecting from the lower portion of the frontal surface 10 is an escutcheon or member 15 which is formed at its central portion with louvers or grill work 16, the latter arrangement facilitating the passage of air to a cooling radiator (not shown) for cooling the vehicle engine. It should be noted that the escutcheon 15 forms or defines the lower edges of the openings 11 and 12 in the frontal surface 10. Disposed rearwardly of the openings 11 and 12 in the frontal surface 10 and contained within the compartment formed by the latter is a pair of headlamps or headlamp units 17 and 18, each unit preferably incorporating a sealed lamp unit 19 of conventional design supported within a metallic casing 20, the latter being mounted upon any suitable supporting means (not shown). The illuminating means or headlamp units are so arranged that light rays emanating from the lamp constructions 19 are projected forwardly through the openings 11 and 12 to normally illuminate the roadway in advance of the vehicle.

We have provided closures 23 and 24 adapted for cooperation with the openings 11 and 12 and which are movable to a closed position as illustrated in Figure 3 to mask or cover the lamp unit 17, and are movable to open positions as shown in figures 4 and 5 so as not to screen or intercept the projection of light rays through the openings 11 and 12. Each of the closures 23 and 24 is formed with a peripheral flange 26, and to the portions of the flange 26 bounding the lateral edges of each of the closures there is secured rewardly extending brackets 27 and 28, the brackets 27 being pivotally supported upon pivot pins 29 carried in supporting members 30 the latter being welded or otherwise secured to flanges 14 as shown in Figure 6. As each of the closures 23 and 24 and their respective supporting means are substantially identical, a description of one and its supporting means will suffice. Also secured to flanges 14 by welding or by other suitable means is a pair of rearwardly extending brackets 32 which serve to support a shaft 33, the axis of shaft 33 being in alignment with the axis of the pivot pins 29. As particularly shown in Figure 7 a bushing 34 extends into the hollow interior of the tubular shaft 33 and serves as a journal or bearing upon which the shaft 33 is rotatably mounted. Each bracket 32 is provided with an opening in alignment with the axis of shaft 33 and is adapted to accommodate the threaded portion of a bolt 35 extending into a threaded opening axially disposed in the bushing 34. The bolt 35 is formed with a shoulder portion 36 arranged to be brought into engagement with a washer or spacer 37 so that when the bolt 35 is drawn into threaded engagement with bushing 34, the bracket 32 is tightly clamped between washer 37 and bushing 34 whereby the bushing is nonrotatably secured to bracket 32. The member 28 secured to a closure is formed with an opening through which extends the shoulder portion 36 of bolt 35 whereby the member 28 is pivotally supported upon the shoulder portion of the bolt. The arrangement just described forms a means arranged at each end of the shaft 33 for pivotally supporting the members 28, which in turn are secured to the flanged portions of each of the closures 23 and 24 as shown in Figure 6.

Manipulating means are provided for moving the closures 23 and 24 to closed and open positions as particularly illustrated in Figures 3 and 4. A member 40 supports a U-shaped bracket or support 41 upon which is pivotally mounted a member or arm 42 by means of a pintle or pivot 43. The upper extremity of arm 42 is provided with a pin 45 upon which is journaled a roller 46 which extends into a slot 47 formed in an arm 48, the latter being welded as at 49 or otherwise fixedly secured to the tubular shaft 33 as shown in Figure 7. The arm 48 is generally of L-shaped configuration and the leg portion 50 of member 48 is pivotally connected by means of a pintle or screw 51 to the inner end of bracket 28. As particularly shown in Figure 8 the arm 42 is provided with an opening to receive a tenon portion 53 formed on a cylindrical member 54 the member being secured to arm 42 by a swaged portion 55, it being understood that the member 54 is not tightly swaged to the arm 42 so as to permit relative pivotal movement of member 54 thereon. The member 54 is provided with an opening to receive a flexible wire 57 which is adjustably held or retained in an opening in member 54 by means of a screw 58. As particularly illustrated in Figure 3, the wire 57 is guided or contained within a sheath 59 which is secured to the dash board 60 or other suitable supporting means mounted upon the vehicle frame. Secured to the extremity of wire 57 is a manipulating means or knob 62 preferably disposed below an instrument panel 63 of the vehicle.

In operating the closures, assuming that the latter are in closed position as viewed in Figure 3, the vehicle operator grasps the knob 62 and by withdrawing the same to the dotted position indicated in Figure 3, the wire 57 being connected to arm 42 causes the latter to pivot about the pin 43 and roller 46 to traverse the cam slot 47 formed in arm 48 to move the arms 42 and 48 into the position illustrated in Figure 4. As the leg portion 50 of arm 48 is pivotally connected by pivot 51 to bracket 28, movement of arm 48 causes the closure 23 to be swung downwardly around the axis of shaft 33 as bracket 28 is pivotally journaled on the shoulder 36 of bolt 35. Due to the fact that the arms 28 of both closures are connected to the tubular shaft 33, the closures 23 and 24 will be simultaneously swung to "open" position upon rotation of shaft 33. It should be noted that the contour of the cam slot 47 is such that when the arm 42 is in either of its positions as indicated in Figures 3 and 4, the angularity of the slot cooperating with the roller 46 is such as to provide a locking angle so that the arm 42 and parts connected therewith including the closures 23 and 24 cannot be moved except by pivotal movement of arm 42 through manipulation of the knob 62 and longitudinal movement of the operating wire 57. By this means the closures and associated parts are retained or locked in either closed or open position and will not vibrate or rattle when the vehicle is traveling over rough terrain. An arm 65, welded to the tubular shaft 33, is connected by means of a contractile spring 66 to the bracket 41, the spring serving to substantially counterbalance the rotational movement of the closures 23 and 24 and the brackets associated therewith about their pivotal axis so that little effort is required in the manipulation of the closures. It will be noted from examination of Figure 3 that when the closures are in closed position, the lamp units 17 are masked thereby and are entirely enclosed within the body compartment formed by the frontal surface 10 and closures 23 and 24, the continuity of the frontal surface being preserved by the particular exterior configuration of the closure blending with the frontal surface. It should also be noted that the escutcheon 15 is partially overlapped by the lower portion of the closures so as to provide a neat appearance and at the same time provide an arrangement wherein the closures may be swung downwardly to open position about a fixed axis, viz. the axis of shaft 33 and pins 29. Through the use of our invention, it is unnecessary to provide means to withdraw the closures laterally out of the openings before the swinging movement can take place as has been necessary in prior structures. When the closures are moved to full open position as illustrated in Figures 2 and 4, there is no obstruction or masking of the rays of light emanating from the headlamp units.

It is apparent that, within the scope of the invention, modifications and different arrangements may be made other than is herein disclosed, and the present disclosure is illustrative merely, the invention comprehending all variations thereof.

What we claim is:

1. In a motor vehicle having an exterior surface formed with an opening; an illuminating means disposed adjacent the opening; a closure for said opening movable to mask and unmask the illuminating means; said closure being supported for pivotal movement about a relatively fixed axis and arranged to swing downwardly to an open position; the exterior surface of said closure being in the same plane with the exterior surface of the vehicle surrounding the opening when said closure is in closed position; an arm arranged for pivotal movement about a relatively fixed axis; a second arm pivotally connected to said closure and arranged for movement simultaneously therewith; a slot formed in one of said arms; a projection carried by the other of said arms and cooperating with said slot whereby movement of said pivoted arm causes movement of said closure; resilient means to partially counterbalance the weight of said closure, said pin and slot connection and said resilient means forming a retaining means for securing said closure in masking and unmasking positions and manipulating means connected to said pivoted arm to control the position of said closure.

2. In a motor vehicle having a frontal surface formed with an opening, an illuminating means disposed adjacent the opening; an escutcheon member projecting exteriorly of the frontal surface and defining a lower edge of the opening; a closure for the opening pivotally supported for movement about a relatively fixed axis and movable to mask or unmask the illuminating means; said closure being arranged to swing downwardly away from said opening in unmasking position; said closure being configurated whereby a portion of its exterior surface is disposed adjacent to and in overlapping relation with said escutcheon member when said closure is in masking position; an arm pivotally supported for movement about a relatively fixed axis out of alignment with the axis of movement of said closure; an elbow arm pivotally connected at one end to said closure; a pin and slot connection between the other end of said elbow arm and said pivotally supported arm; said elbow arm being pivotally mounted intermediate its ends about an axis in alignment with the axis of movement of said closure; manipulating means connected to said closure for moving the latter to masking or unmasking positions, and means including said pin and slot connection for holding said closure in masked or unmasked positions.

EDGARD C. DE SMET.
JOHN W. DICKASON.

REFERENCES CITED

The following references are of record in the file of this patent:

UNITED STATES PATENTS

| Number | Name | Date |
|---|---|---|
| 2,329,684 | Ashley | Sept. 21, 1943 |
| 2,331,973 | Grose | Oct. 19, 1943 |
| 2,360,461 | Ackerman | Oct. 17, 1944 |
| 2,360,530 | Voorhees et al. | Oct. 17, 1944 |